United States Patent
Saiki et al.

(10) Patent No.: US 7,644,164 B2
(45) Date of Patent: Jan. 5, 2010

(54) RELAY PROGRAM, COMMUNICATION PROCESSING PROGRAM, AND FIREWALL SYSTEM

(75) Inventors: Taro Saiki, Kawasaki (JP); Satoshi Iyoda, Kawasaki (JP); Yoshimasa Koyama, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 11/818,215

(22) Filed: Jun. 13, 2007

(65) Prior Publication Data

US 2008/0028078 A1 Jan. 31, 2008

Related U.S. Application Data

(63) Continuation of application No. PCT/JP2004/019035, filed on Dec. 20, 2004.

(51) Int. Cl.
G06F 15/16 (2006.01)
G06F 15/173 (2006.01)

(52) U.S. Cl. .................. 709/227; 709/203; 709/228; 709/230; 709/245

(58) Field of Classification Search .......... 709/203, 709/217, 227, 228, 230, 238, 245
See application file for complete search history.

(56) References Cited

U.S. PATENT DOCUMENTS

| 6,421,732 | B1 * | 7/2002 | Alkhatib et al. | 709/245 |
|---|---|---|---|---|
| 6,473,406 | B1 * | 10/2002 | Coile et al. | 709/230 |
| 6,894,981 | B1 * | 5/2005 | Coile et al. | 709/227 |
| 7,016,348 | B2 * | 3/2006 | Laursen et al. | 709/217 |
| 7,136,359 | B1 * | 11/2006 | Coile et al. | 709/227 |
| 7,298,733 | B2 * | 11/2007 | Sakai et al. | 709/228 |

FOREIGN PATENT DOCUMENTS

| JP | 10-215248 | 8/1998 |
|---|---|---|
| JP | 2002-288098 | 10/2002 |
| JP | 2003-030064 | 1/2003 |
| JP | 2004-222181 | 8/2004 |

\* cited by examiner

*Primary Examiner*—Quang N. Nguyen
(74) *Attorney, Agent, or Firm*—Greer, Burns & Crain, Ltd.

(57) ABSTRACT

A relay program, communication processing program, and firewall system capable of simplifying security management in a firewall. In a firewall, only an aggregation port that is an aggregation of one or a plurality of ports to be allowed to pass through is set to be allowed. When a communication source client makes a connection with a target connection request destination connected to an internal network, the communication source client issues connection request information specifying the target connection request destination with its destination set to the aggregation port. In a relay server, a connection request information acquisition unit reads the connection request information that passed through the firewall and is input via the aggregation port. A relay unit changes the destination to the target connection request destination based on the connection request information and sends the connection request information to the target connection request destination to thereby make a connection request, and also sends connection result information obtained from the target connection request destination to the communication source client.

12 Claims, 12 Drawing Sheets

RELAY PROGRAM, COMMUNICATION PROCESSING PROGRAM, AND FIREWALL SYSTEM

This application is a continuing application, filed under 35 U.S.C. §111(a), of International Application PCT/JP2004/019035, filed Dec. 20, 2004.

BACKGROUND OF THE INVENTION

1. Field of the Invention

This invention relates to a relay program, a communication processing program, and a firewall system, and more particularly to a relay program, communication processing program, and a firewall system, for relaying data communication passing through a firewall that is installed at a connection point between an external network and an internal network to manage communication.

2. Description of the Related Art

Recently, with expansion of computer network, network security for preventing computer hacking and protecting confidential data in network environment becomes more crucial.

In general, TCP/IP (Transmission Control Protocol/Internet Protocol) is widely used as a protocol to perform communication between computers. In TCP/IP, IP addresses and TCP ports are used to specify target computer devices. Hereinafter, a communication port of a target computer device specified by an IP address and a TCP port is called a port or a socket. In order to ensure security in information management, a control mechanism called a firewall is provided for communication between computer devices, which allows communication only between specified ports.

A firewall is installed at a connection point between an external network and an internal network. When the firewall receives an access request that should pass through the firewall, from the external network, it determines under preset rules whether to allow or deny this access request, thereby preventing unauthorized accesses to the internal network. In this connection, there is a firewall system that effectively uses network resources by establishing a connection with a computer device requesting an access only when determination on whether to allow or deny the access request results in allowance of the access request (for example, refer to Japanese Unexamined Patent Publication No. 10-215248 (paragraphs [0013] to [0020], FIG. 1)).

FIG. 12 shows an example of a communication control function using a firewall.

A firewall 901 is installed at a connection point between an external network to which a communication source client 902 is connected and an internal network to which a communication destination server 1 (903) and a communication destination server 2 (904) are connected, and is designed to determine under preset rules whether to allow or deny an access request from the communication source client 902. The communication source client 902 issues an access request to access the communication destination server 1 (903) or the communication destination server 2 (904) that exists beyond the firewall, by using a TCP port that is specified for each application.

For example, assume now that the firewall 901 has rules that allow access requests issued from a combination of an IP address of "111.123.1.50" and a TCP port of "80" and a combination of an IP address of "111.123.1.51" and a TCP port of "81". In this case, only when an access request received from the communication source client 902 matches the combination of the IP address of "111.123.1.50" and the TCP port of "80" or the combination of the IP address of "111.123.1.51" and the TCP port of "81", which is set as the rules, the access request is allowed to pass through the firewall 901.

As explained above, in order to perform communication through a firewall by using a specified port, the port to be allowed to pass through should be registered in the firewall. For example, in FIG. 12, the ports 80 and 81 should be set in the firewall.

However, in conventional settings in firewalls, ports to be used for respective applications should be set to be allowed. Therefore, if there are a plurality of applications, a large number of ports should be managed. This causes a lot of efforts in security management, which is a problem. In addition, in an application that requires bi-directional communication between a communication source client of an external network and a communication destination server of an internal network, such as obtaining an event result, a port of sending an event result from the internal network, in addition to a port of sending an access request from the external network, should be separately set in the firewall.

That is to say, the number of ports to be set in a firewall for management increases with increase in a system scale. When a new application is installed under a circumstance where there are many ports to be managed, setting in the firewall that should be correctly done probably has errors. In addition, setting in the firewall should be changed according to removal or change of applications. However, if there are many registrations, not only errors in setting but also necessity of change may be missed or disregarded. Such errors in setting and missing of version upgrading cause security holes, which may greatly lower the security level. In actual, it is known that security holes are created due to man-caused errors.

SUMMARY OF THE INVENTION

This invention has been made in view of the foregoing and intends to provide a relay program and a firewall system, which use a firewall and are capable of simplifying security management in the firewall and preventing deterioration of security level due to man-caused errors.

To solve the above problems, this invention intends to provide a computer-readable recording medium containing a relay program for relaying data communication through a firewall installed at a connection point between an external network and an internal network to manage communication, the relay program causing a computer to perform as: a connection request information acquisition unit for receiving connection request information including a target connection request destination which was issued by a communication source client with a destination set to an aggregation port to make a connection request with the target connection request destination and is to be input via the aggregation port when the firewall allows the connection request information to pass through, the aggregation port being an aggregation of one or a plurality of ports to be allowed to be accessed and being set to be allowed in the firewall, the communication source client connected to the external network, the target connection request destination being in the internal network; and a relay unit for extracting the target connection request destination from the connection request information and sending the connection request information with the destination set to the target connection request destination to make the connection request, and also receiving connection result information from the target connection request destination and sending the connection result information to the communication source client.

Further, to solve the above problems, this invention intends to provide a computer-readable recording medium containing a communication processing program for performing a communication process with a server connected to an internal network through a firewall installed at a connection point between an external network and the internal network to manage communication, the communication processing program causing a computer to perform as communication processing unit for creating connection request information including a target connection request destination and issuing the connection request information with a destination set to an aggregation port of a relay server to make a connection request when accessing the target connection request destination connected to the internal network through the firewall, and also receiving via the relay server connection result information created by the target connection request destination in response to the connection request information relayed by the relay server having the aggregation port to the target connection request destination, the aggregation port being an aggregation ports to be allowed to be accessed and being set to be allowed in the firewall.

Still further, to solve the above problems, this invention intends to provide a firewall system having a firewall that is installed at a connection point between an external network and an internal network and allows only packets of a port previously set to be allowed, comprising: the firewall where an aggregation port that is an aggregation of one or a plurality of ports to be allowed to be accessed is set to be allowed and which acquires an access from a communication source client connected to the external network and allows only an access specifying the aggregation port as a destination to pass through; a communication source client that creates connection request information including a target connection request destination and issues the connection request information with a destination set to the aggregation port when accessing the target connection request destination connected to the internal network through the firewall, and also receives connection result information created by the target connection request destination in response to the connection request information; and a relay server that is provided with the aggregation port and includes connection request information acquisition unit for receiving the connection request information that was issued by the communication source client and was allowed by the firewall to pass through, and relay unit for sending the connection request information with the destination changed to the target connection request destination based on the received connection request information, and also receiving the connection result information from the target connection request destination and sending the connection result information to the communication source client, wherein the connection request information issued by the communication source client is collectively received by the relay server to be distributed to the target connection request destination, and the connection result information created by the target connection request destination is relayed by the relay server to the communication source client making a connection request.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, a preferred embodiment of the present invention will be described with reference to the accompanying drawings. The concept of the invention that is implemented in the embodiment will be first explained, and then the embodiment will be specifically explained.

Figure 1:
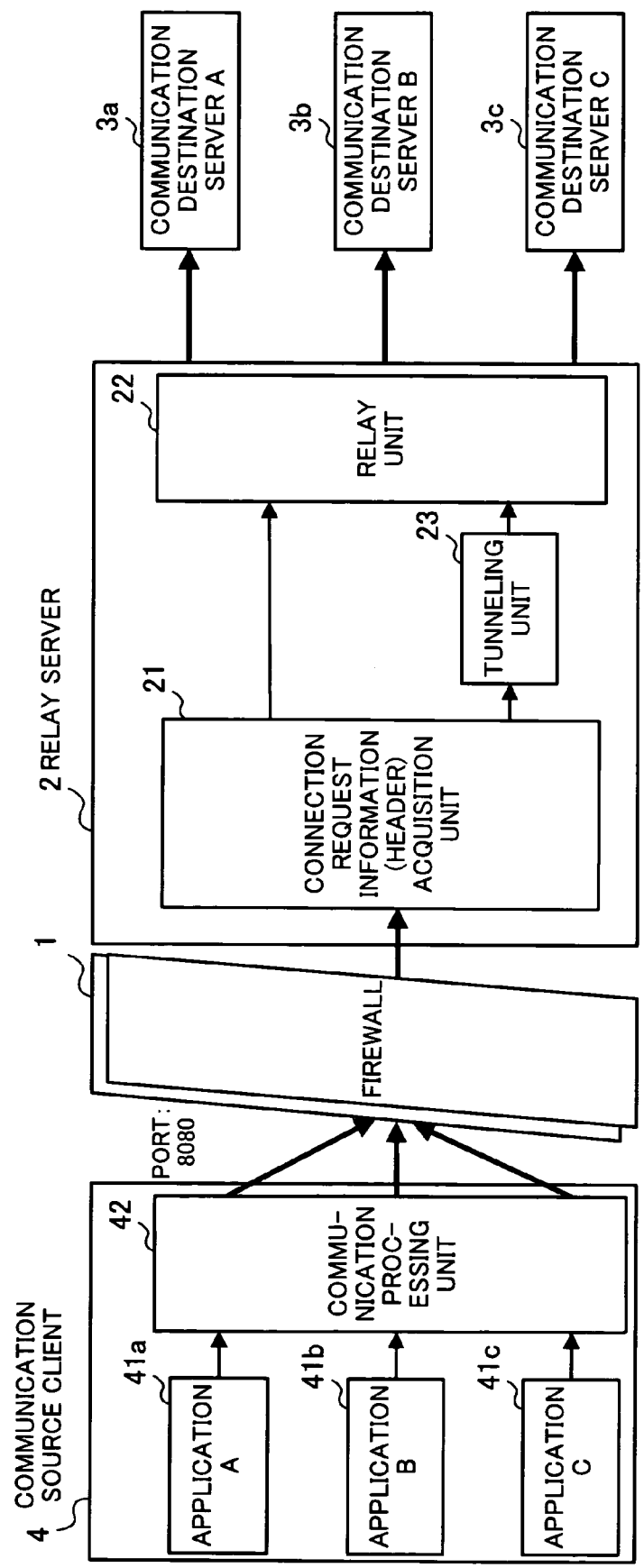
FIG. 1 is a conceptual view of the invention that is implemented in one embodiment.

FIG. 1 is a conceptual view of the invention that is implemented in the embodiment.

A firewall system according to this invention has a communication source client 4 connected to an external network, and a relay server 2, a communication destination server A (3a), a communication destination server B (3b), and a communication destination server C (3c) connected to an internal network, and a firewall 1 installed at a connection point between the external network and the internal network, and packet communication is performed between the communication source client 4 and the communication destination server (3a, 3b, 3c) (hereinafter, a communication destination server (3a, 3b, 3c) represents any one in the case where it is unnecessary to particularly specify any one).

The external network refers to a network from which accesses to the internal network are restricted by the firewall 1. The internal network refers to a network that is protected by the firewall 1 with a high security level from attacks and unauthorized accesses from outside. It should be noted that the firewall 1 and the relay server 2 can be realized by separate devices or one device. In addition, this figure shows a flow of a packet that flows from the communication source client 4 through the firewall 1 and the relay server 2 to the communication destination server (3a, 3b, 3c). In addition to this, in communication, a response packet as a response flows from the communication destination server (3a, 3b, 3c) through the relay server 2 and the firewall 1 to the communication source client 4.

The firewall 1 monitors communication performed via the external network and the internal network, determines under preset rules whether to allow or deny connection requests, and allows only allowed requests to pass through. In this embodiment, the preset rules specify that only access requests destined for one aggregation port that is an aggregation of one or a plurality of ports are allowed. Here, one port (port 8080 in the example of FIG. 1) of the relay server 2, at minimum, is set in the aggregation port. Therefore, in the case where the communication source client 4 connected to the external network accesses the communication destination server (3*a*, 3*b*, 3*c*) of the internal network, the access always has to pass through the relay server 2.

The relay server 2 has a connection request information acquisition unit (hereinafter, referred to as a header acquisition unit) 21 for receiving connection request information, a relay unit 22 for performing a relay process, and a tunneling unit 23 for performing a tunneling process.

The header acquisition unit 21 acquires the header portion of a communication packet including connection request information, analyzes the contents of the header portion, and starts the tunneling unit 23 if the tunneling process should be performed. The header acquisition unit 21 directly starts the rely unit 22 in the other case.

The relay unit 22 performs the relay process by changing the destination of a packet sent from the communication source client 4 to a target connection request destination and sending the packet to the communication destination server (3*a*, 3*b*, 3*c*). In addition, the relay unit 22 performs the relay process by sending a response packet received from the communication destination server (3*a*, 3*b*, 3*c*) to the communication source client 4 as a destination. If the contents of the header portion should be changed at the time of relaying a packet or a response packet, the header portion is updated and then the transmission process is performed. For example, if connection request information includes route information on a server via which the packet arrives at a target connection request destination, and the route information includes information on the own device (relay server 2), the relay server 2 deletes the information on the relay server 2 from the route information. On the other hand, the relay unit 22 adds route information to a response packet received from the communication destination server (3*a*, 3*b*, 3*c*), and sends the response packet to the communication source client 4.

The tunneling unit 23 secures a connection with the communication source client 4 and a connection with the communication destination server (3*a*, 3*b*, 3*c*), and after securing the connections, sends a packets received from the communication source client 4 with changing the destination of the packet to the communication destination server (3*a*, 3*b*, 3*c*) without operating the contents of the packet, and similarly, sends a response packet received from the communication destination server (3*a*, 3*b*, 3*c*) with changing the destination of the response packet to the communication source client without operating the contents of the packet. In this way, a process in which the relay server 2 renames a destination and relays a packet with keeping the contents of the packet untouched is called a tunneling process. The tunneling process including a negotiation process for securing both connections will be described in detail later.

The communication destination server A (3*a*), the communication destination server B (3*b*), and the communication destination server C (3*c*) are target connection destinations of data communication from the communication source client 4, and perform the data communication with the communication source client 4 via the relay server 2.

The communication source client 4 has a plurality of applications including an application A (41*a*), an application B (41*b*), and an application C (41*c*), and also has a communication processing unit 42 for performing a communication process. Hereinafter, an application (41*a*, 41*b*, 41*c*) represents any one if it is unnecessary to particularly specify any one.

The application (41*a*, 41*b*, 41*c*) performs its application process, and when an occasion arises, creates a header portion including connection request information specifying a target connection request destination to the communication processing unit 42 and describing a request to the connection request destination, and requests communication to the communication processing unit 42. Header portions have different contents according to applications. Further, different communication protocols may be used. For example, communication to a Web server may be performed with HTTP or communication may be performed after securing security with SSL. As another case, information on an event occurring in the communication destination server (3*a*, 3*b*, 3*c*) may be required.

The communication processing unit 42 accesses the communication destination server (3*a*, 3*b*, 3*c*) connected to the internal network through the firewall 1 in response to a request from the application (41, 41*b*, 41*c*). When obtaining a header portion from the application (41*a*, 41*b*, 41*c*), the communication processing unit 42 changes the contents of the header portion according to necessity, and issues connection request information with its destination set to an aggregation port, to thereby make a connection request. For example, if it is necessary to set information on a rely server that relays a packet, in the header portion, the communication processing unit 42 adds route information to the header portion and then sends a packet to the aggregation port. Then, the communication processing unit 42 receives via the relay server 2 connection result information created as a response by the target connection request destination. In addition, in the case where information on an event occurring at certain timing in the communication destination server (3*a*, 3*b*, 3*c*) is necessary, the communication processing unit 42 repeatedly sends a packet requesting for the event information in accordance with the above described procedure until it obtains the event information.

It should be noted that the processing unit of the relay server 2 in the above description realize their processing functions by a computer executing a relay program. In addition, the processing unit and applications of the communication source client 4 in the above description realize their processing functions by a computer executing a communication processing program and an application program.

The operations of a firewall system having the above configuration will be described.

In the firewall 1, only the aggregation port (8080) that is an aggregation of prescribed ports of the relay server 2 is set to be allowed.

When obtaining connection request information from an application (41*a*, 41*b*, 41*c*), the communication source client 4 performs a header conversion process such as adding route information on the relay server 2 that performs a relay process according to necessity, and sends a packet with its destination set to the aggregation port (8080) of the relay server 2.

The firewall 1 monitoring packets allows the packet specifying the aggregation port (8080) as the destination to pass through, and the packet is received by the relay server 2.

In the relay server 2, the header acquisition unit 21 extracts the header portion, analyzes the contents of the header portion, and if a tunneling process is necessary, starts the tunneling unit 23.

If the tunneling process is unnecessary, the relay server 2 directly starts the relay unit 22. The relay unit 22 performs the header conversion process such as deleting route information added to the connection request information of the packet received from the communication source client 4, and then sends the packet with its destination set to the communication destination server (3a, 3b, 3c) that is the target connection request destination. Then, when receiving a response packet including connection result information from the communication destination server (3a, 3b, 3c), the relay unit 22 performs the header conversion process such as adding route information, and then sends the response packet with its destination set to the communication source client 4.

On the other hand, in the case where the tunneling process is to be performed, the tunneling unit 23 is started, and first a connection with the communication source client 4 and a connection with the communication destination server (3a, 3b, 3c) that is a target connection request designation are both secured. After both of the connections are secured, the destinations of packets exchanged between the communication source client 4 and the communication destination server (3a, 3b, 3c) are renamed, and the packets received from the communication source client 4 are sent to the communication destination server (3a, 3b, 3c), and the packets received from the communication destination server (3a, 3b, 3c) are sent to the communication source client 4.

In this way, the relay server performs the relay process for relaying a packet to an original connection request destination based on connection request information. Therefore, a request from the communication source client connected to the external network is collected to the relay server once, and then can be distributed from the relay server to a communication destination server that is an original connection request destination. Therefore, to realize a prescribed application, ports to be set to be allowed in the firewall can be aggregated into one port at minimum. This can not only simplify the port management in the firewall, but also prevent creation of security holes due to errors in port setting. Conventionally, the number of ports to be set in a firewall may be several tens of thousands, although it depends on a system scale. If the ports can be aggregated into one port at minimum, the maintenance of security level can be highly expected.

Hereinafter, the first embodiment employing HTTP as an example will be described with reference to the accompanying drawings. The HTTP comprises a request requesting transfer of information and a response to the request from a server. A communication source client sends information including a URL path name, the type of Web browser, and a used language as a GET request to a server, and obtains a response including data or error codes from the server.

Figure 2:
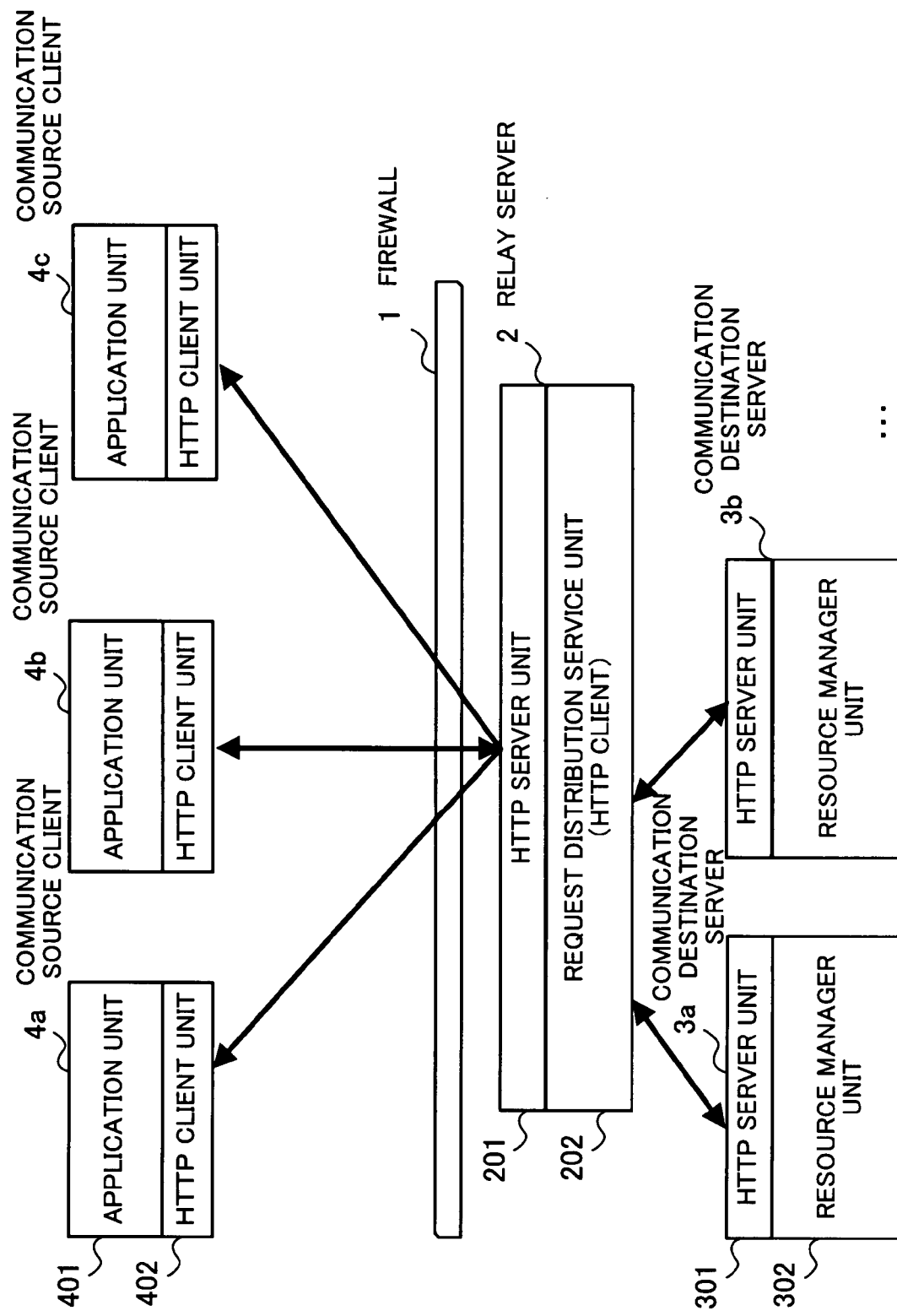
FIG. 2 is a schematic view showing the configuration according to the first embodiment.

FIG. 2 is a schematic view showing the configuration of the first embodiment. The components identical to those of FIG. 1 are given same reference numbers and their description is omitted.

A relay server 2 has an HTTP server unit 201 for performing an HTTP server process with communication source clients 4a, 4b, and 4c, and a request distribution service unit 202 for performing a request distribution service with communication destination servers 3a and 3b. The HTTP server processing unit 201 establishes a connection with a requesting communication source client 4a, 4b, 4c according to a packet received from the communication source client 4a, 4b, 4c via an aggregation port set to be allowed in a firewall 1, and gives the packet to the request distribution service unit 202. Then the HTTP server unit 201 sends a response packet received from the request distribution service unit 202 to the requesting communication source client 4a, 4b, 4c. The request distribution service unit 202 functions as an HTTP client for the communication destination server 3a, 3b that is an original connection request destination. The request distribution service unit 202 changes the destination to the target connection request destination (communication destination server 3a, 3b) based on the connection request information of the HTTP packet given from the HTTP server unit 201, and sends the HTTP packet. Then the request distribution service unit 202 gives the HTTP server unit 201a response packet obtained as a response.

The communication destination server 3a, 3b has a similar configuration, and has an HTTP server unit 301 for performing an HTTP server process and a resource manager unit 302 for managing resources. The HTTP server unit 301 analyzes the HTTP packet received via the relay server 2, and when determining that the packet is authenticated, gives the process to the resource manager unit 302, and then creates a response packet by using obtained data and sends the response packet to the relay server 2. The resource manager unit 302 returns a result obtained by performing a requested process such as readout of data to the HTTP server unit 301.

The communication source client 4a, 4b, 4c has a similar configuration, and has an application unit 401 for performing an application process and an HTTP client unit 402 for performing an HTTP client process. The application unit 401 performs a prescribed application process, and when an occasion arises, requests an access to the communication destination server 3a, 3b, to the HTTP client unit 402. When the HTTP client unit 402 receives the access request from the application unit 401, it creates a request packet destined for the communication destination server 3a, 3b according to the HTTP protocol. At this time, the HTTP client unit 402 sets the target communication destination server (3a, 3b) in connection request information, and sends the packet with its destination set to the aggregation port of the relay server 2. On the other hand, the HTTP client unit 402 gives a received packet to the application unit 401.

In such a firewall system, if the application unit 401 of the communication source client 4a requires making a data request to the communication destination server 3a, the HTTP client 402 creates a packet of the request in response to the request from the application unit 401. This packet is sent with the target connection request destination (communication destination server 3a) set in connection request information and its destination set to the aggregation port of the relay server 2. This packet passes through the firewall 1 where the aggregation port is set to be allowed, and is received by the HTTP server unit 201 of the relay server 2, and sent from the request distribution service unit 202 with its destination changed to the target connection request destination (communication destination server 3a). The communication destination server 3a receives this packet at the HTTP server unit 301. The HTTP server unit 301 creates a response packet representing a result of the requested process performed by the resource manager unit 302, and sends the response packet to the relay server 2. In the relay server 2, the request distribution service unit 202 changes the destination to the communication source client 4a, and the HTTP server unit 201 sends the packet to the communication source client 4a. Then at the communication source client 4a, the HTTP client unit 402 receives the response packet and gives the requested data to the application unit 401.

Figure 3:
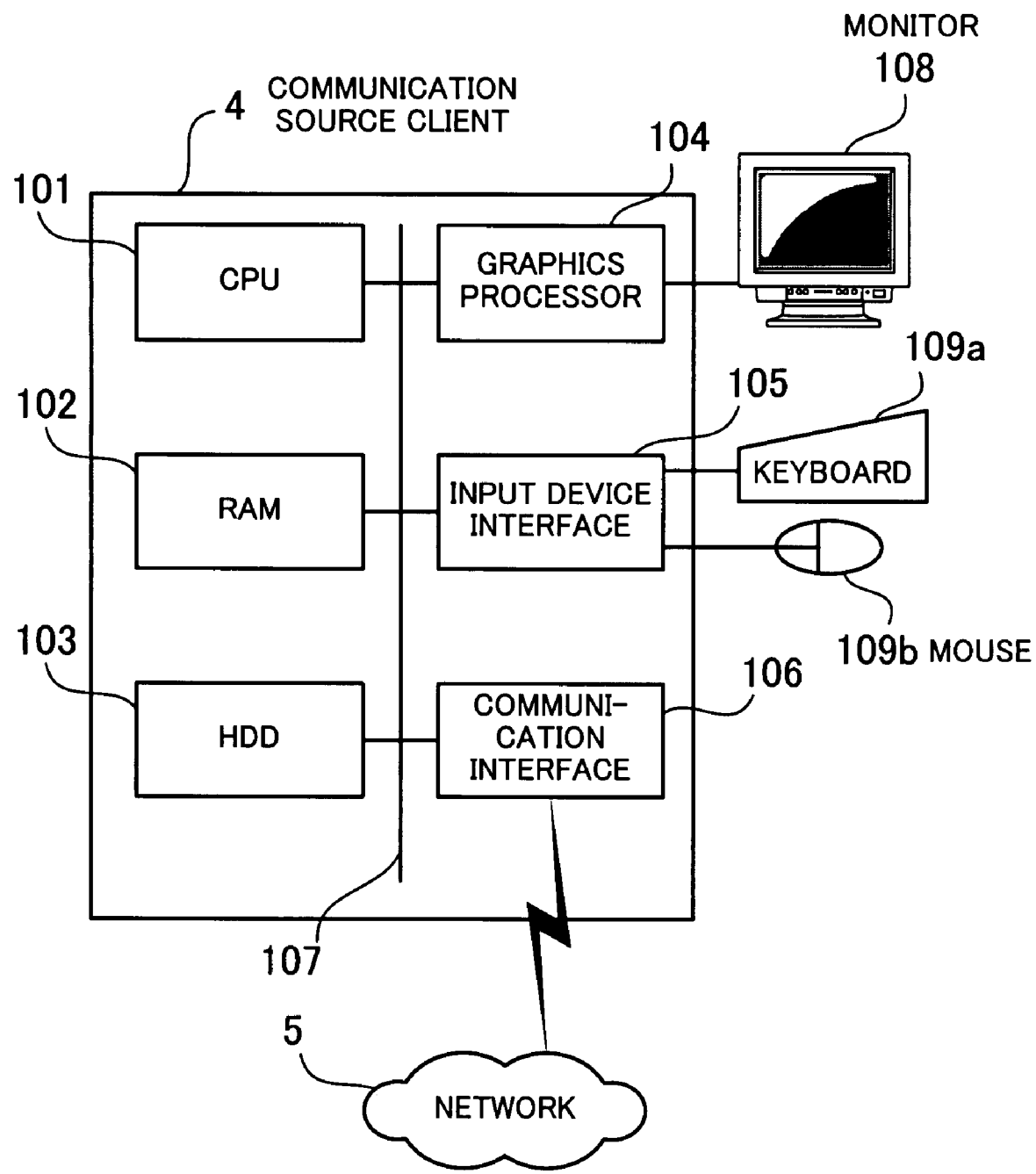
FIG. 3 is a block diagram showing an example hardware configuration of a communication source client according to this embodiment.

By the way, the processing functions of the firewall 1, the relay server 2, the communication destination servers 3a and 3b, and the communication source clients 4a, 4b, and 4c can be realized by computers executing programs. The hardware configuration of each device will be described by using a communication source client as an example. FIG. 3 is a block diagram showing an example hardware configuration of a communication source client according to this embodiment.

The communication source client 4 is entirely controlled by a CPU (Central Processing Unit) 101. The CPU 101 is connected via a bus 107 to a RAM (Random Access Memory) 102, a hard disk drive (HDD: Hard Disk Drive) 103, a graphics processor 104, an input device interface 105, and a communication interface 106.

The RAM 102 temporarily stores a part of OS (Operating System) program and application programs to be executed by the CPU 101. In addition, the RAM 102 stores various kinds of data required for processes that are performed by the CPU 101. The HDD 103 stores the OS and application programs. The graphics processor 104 is connected to a monitor 108 and is designed to display images on the screen of the monitor 108 in accordance with commands from the CPU 101. The input device interface 105 is connected to a keyboard 109a and a mouse 109b, and is designed to transfer signals from the keyboard 109a and the mouse 109b to the CPU 101 via the bus 107. The communication interface 106 is connected to a network 5 and is designed to communicate data with a relay server 2 via the network 5.

With the above hardware configuration, the processing functions of this embodiment can be realized. It should be noted that FIG. 3 shows the hardware configuration of the communication source client, and the firewall, relay server, and communication destination servers have the identical hardware configuration.

Figure 4:
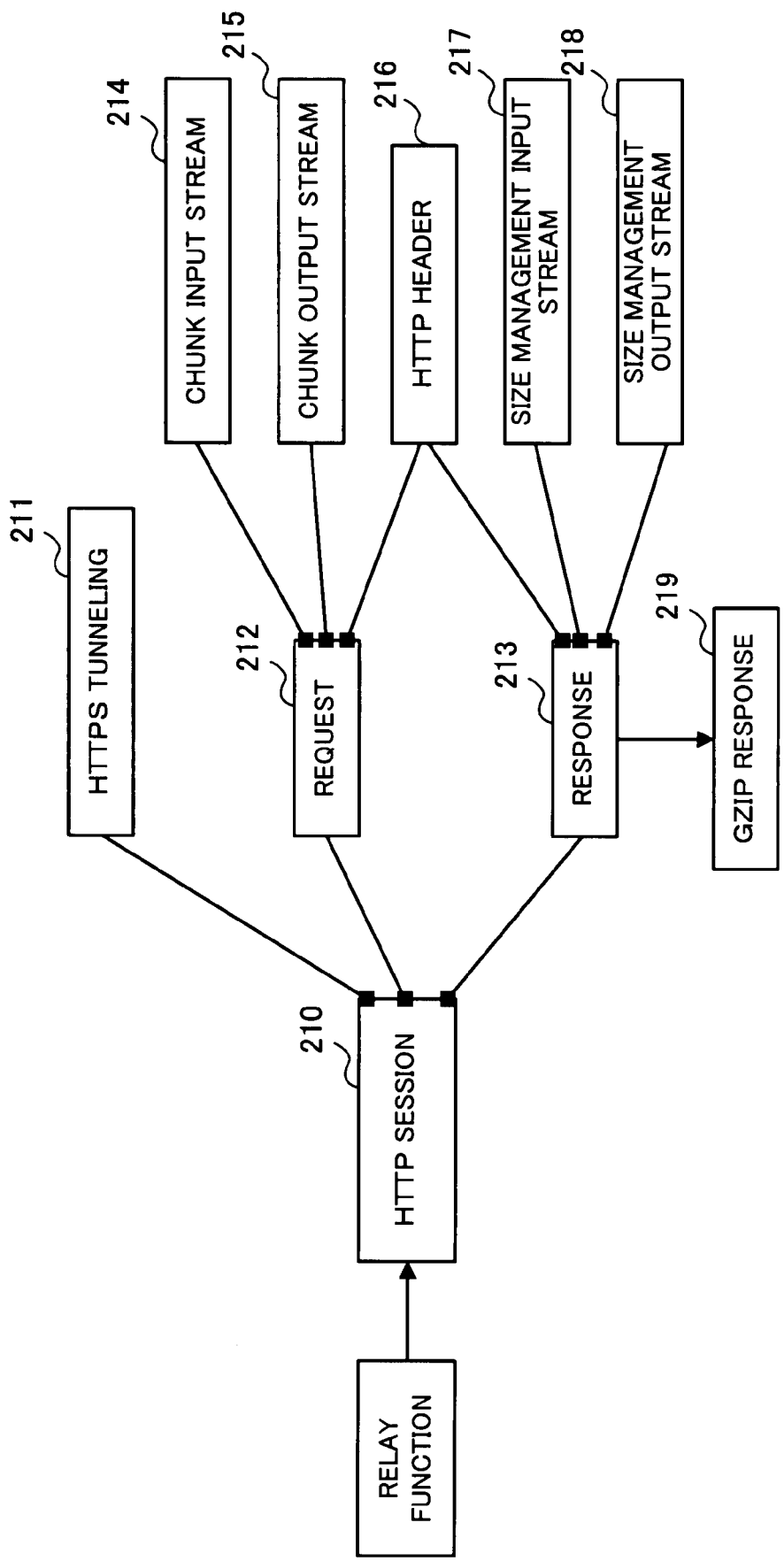
FIG. 4 is a view showing an example software module configuration of a relay server according to the embodiment.

Now, the software module configuration of a relay server will be described. FIG. 4 is a view showing an example software module configuration of a relay server according to this embodiment.

To realize the relay function of the relay server 2, an HTTP session 210 has a group of modules including an HTTPS tunneling 211, a request 212, a response 213, a chunk input stream 214, a chunk output stream 215, an HTTP header 216, a size management input stream 217, a size management output stream 218, and a GZIP response 219.

The HTTP session 210 entirely manages HTTP communication, such as creation of information to establish communication. The HTTPS tunneling 211 controls a tunneling process in the case where SSL is applied. The request 212 is a module that manages data communication from a communication source client to a communication destination server, and performs data control by using the chunk input stream 214 for managing a flow of data from a client of a requesting side, the chunk output stream 215 for managing a flow of data from a communication destination server of a processing side, and the HTTP header 216 for operating an HTTP header. The response 213 is a module that manages data communication from a communication destination server to a communication source client, and performs data control by using the size management input stream 217 for controlling a data stream to be sent to a communication destination server, the size management output stream 218 for controlling a data stream to be sent from a communication destination server, and the HTTP header 216. In addition, compressed data is decoded by the GZIP response 219 according to necessity.

Figure 5:
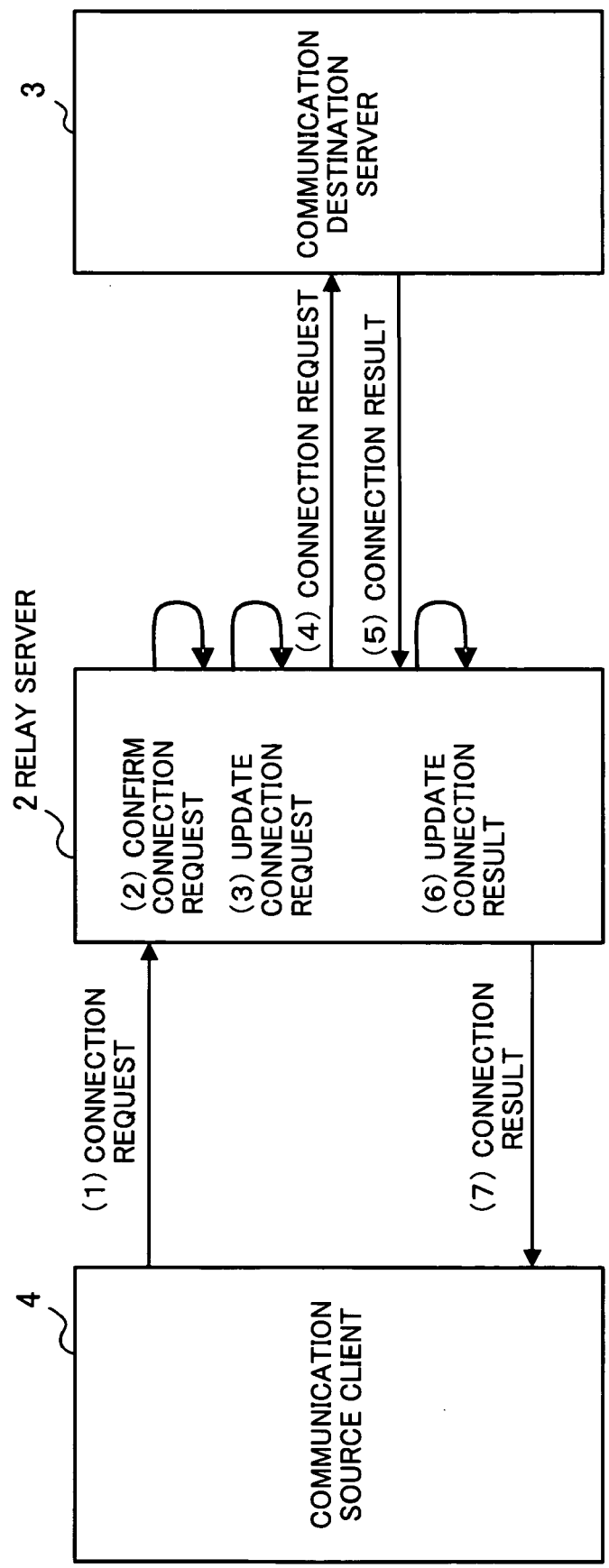
FIG. 5 is a view showing a flow of an HTTP relay process according to the embodiment.

The operations of the HTTP relay process by the relay server having the above configuration will be described. FIG. 5 is a view showing a flow of the HTTP relay process according to the embodiment.

(1) A connection request to the communication destination server 3 is issued from the communication source client 4 with its destination set to the relay server 2. In the connection request, a target connection request destination is set as connection request information.

(2) The relay server 2 receives the connection request from the communication source client 4 and confirms the contents of the connection request.

(3) After confirming the connection request, the relay server 2 updates the contents of the connection request information to match the target connection request destination. For example, when route information on the relay server 2 is included in the connection request information, this information is deleted.

(4) The relay server 2 sends the updated connection request information with its destination set to the communication destination server 3 that is the target connection request destination.

(5) The communication destination server 3 receives the connection request from the communication source client 4 via the relay server 2, deals with the connection request in a prescribed way, and sends a connection result to the relay server 2.

(6) The relay server 2 receives the connection result from the communication destination server 3, and updates the contents of the obtained connection result information to match the communication source client. For example, route information on the relay server 2 has been deleted, relay information is added.

(7) The relay server 2 sends the updated connection result information to the communication source client 4.

With the above procedure, a series of the communication process is performed.

Now, change of connection request information (HTTP header) will be described by using an example.

Figure 6:
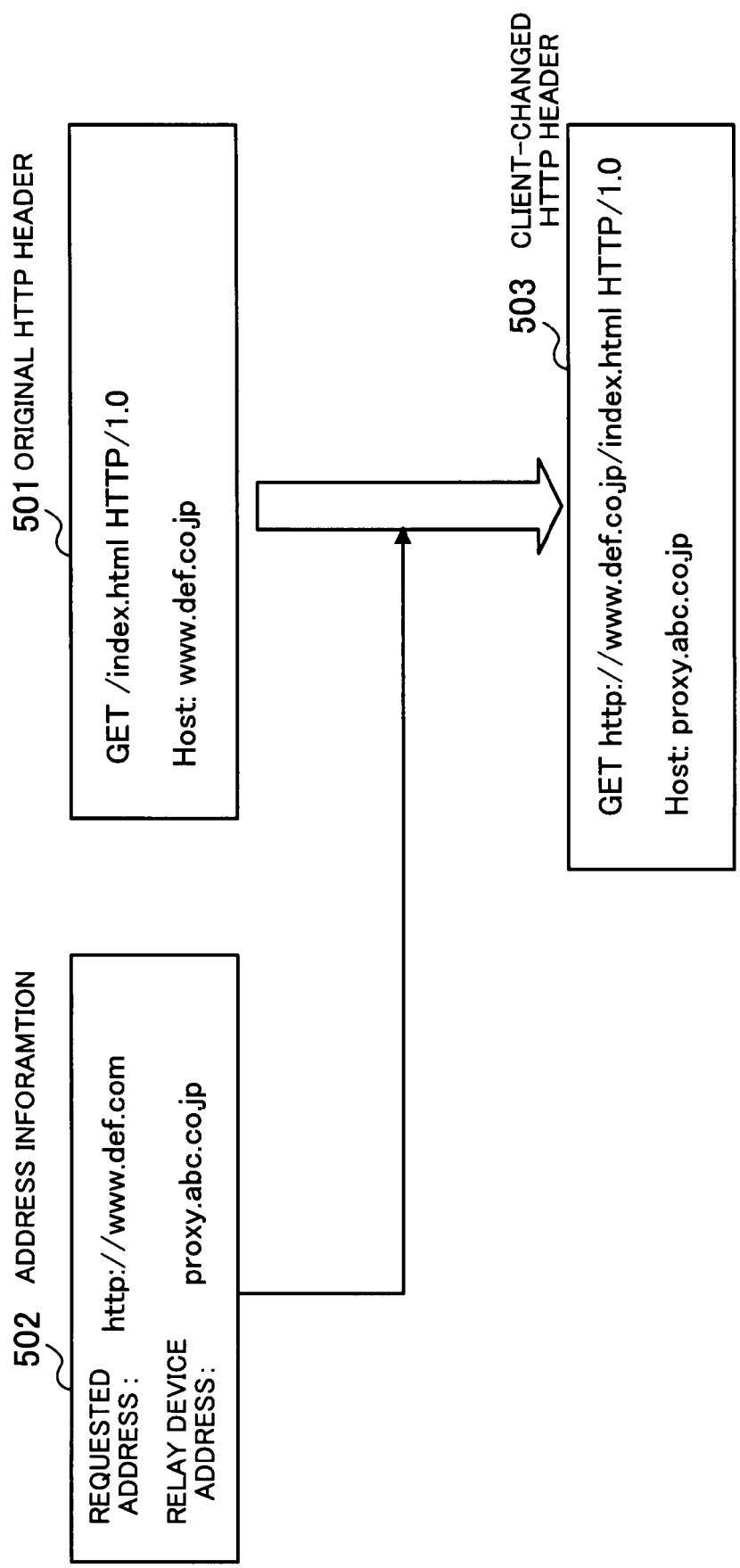
FIG. 6 is a view showing an example of change of connection request information (HTTP header) by a communication source client according to the embodiment.

First, the header conversion process by the communication source client 4 will be described. FIG. 6 is a view showing an example of change of connection request information (HTTP header) by a communication source client according to this embodiment.

The communication source client 4 creates a client-changed HTTP header 503 with route information added to an HTTP header, by using an original HTTP header 501 created according to an application and address information 502 including a requested address indicating a target connection request destination and a relay device address identifying a relay server.

At first, a target connection request destination is added to an original GET command. In the example of this figure, a target connection destination [www.def.co.jp] is added to a GET command [GET/index.htmlHTTP/1.0] shown in the original HTTP header 501, thereby creating [GET/http://www.def.co.jp/index.htmlHTTP/1.0] shown in the client-changed HTTP header 503.

In addition, the connection request destination is changed from the target connection request destination to the relay server. In the example of this figure, [Host:www.def.co.jp] representing the target connection request destination indicating the target connection request destination shown in the original HTTP header 501 is changed to [Host:proxy.abc.co.jp] representing the relay server shown in the client-changed HTTP header 503.

By the communication source client 4 performing the above procedure, the HTTP header with its destination set to the relay server 2 and with the target connection request destination set therein is created and is sent to the relay server 2.

Figure 7:
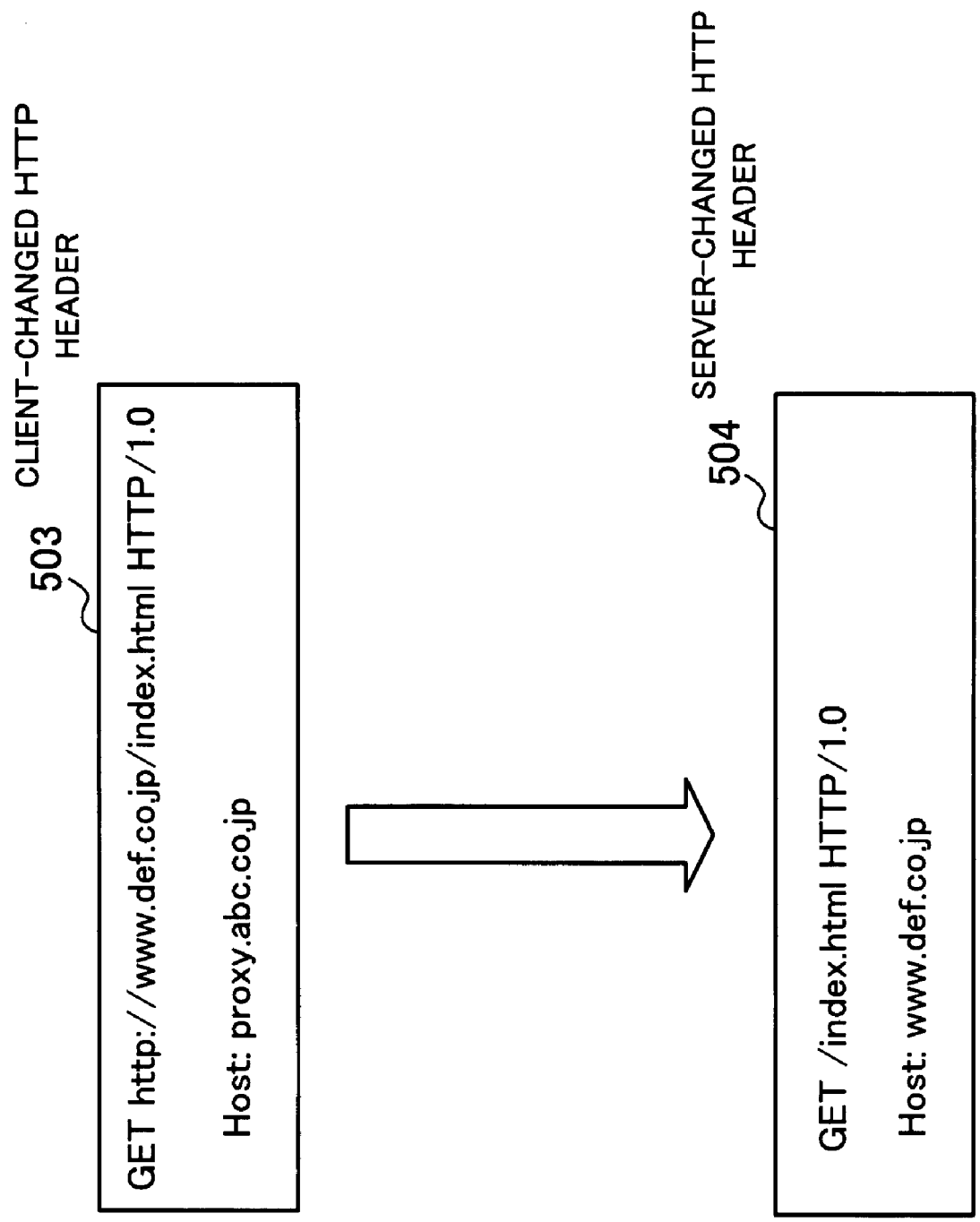
FIG. 7 is a view showing an example of change of connection request information (HTTP header) by a relay server according to the embodiment.

The relay server 2 receives the client-changed HTTP header 503 from the communication source client 4 and performs the header conversion. FIG. 7 is a view showing an example of change of connection request information (HTTP header) by the relay server according to the embodiment.

The relay sever 2 first deletes the target connection request destination added to the GET command. In the example of this figure, [www.def.co.jp] is deleted from [GET/http://www/.def.co.jp/index.htmlHTTP/1.0] of the client-changed HTTP header 503, thereby creating [GET/index.htmlHTTP/1.0] shown in the server-changed HTTP header 504.

Further, the connection request destination is changed. In the example of this figure, [Host:proxy.abc.co.jp] representing the relay server shown in the client-changed HTTP header 503 is changed to [Host:www.def.co.jp] representing the target connection request destination shown in the server-changed HTTP header 504.

By the relay server 2 executing the above procedure, information that the communication source client 4 added for the relay process is deleted, thereby creating a header identical to the original HTTP header.

The original HTTP header is sent to the target connection request destination. In addition, the HTTP header of a response packet that is sent from the target connection request destination is subjected to the same process, and the response packet is sent to the communication source client 4 via the relay server 2.

By the way, in the HTTP, an SSL communication protocol may be used as a security function. The SSL is considered to be positioned between the TCP layer and the application layer, and encrypts and sends data of higher-level HTTP. Even if data communication using SSL is tapped, the contents are very difficult to analyze or falsify, and therefore SLL is widely used for transmitting data safe. Therefore, connection information and its communication contents can be owned by a specified connection source and connection destination only, and its HTTP header cannot be analyzed and changed, like the above example. Therefore, a tunneling communication function for relaying between a connection source and a connection destination in communication without touching the contents of SSL communication is realized.

Figure 8:
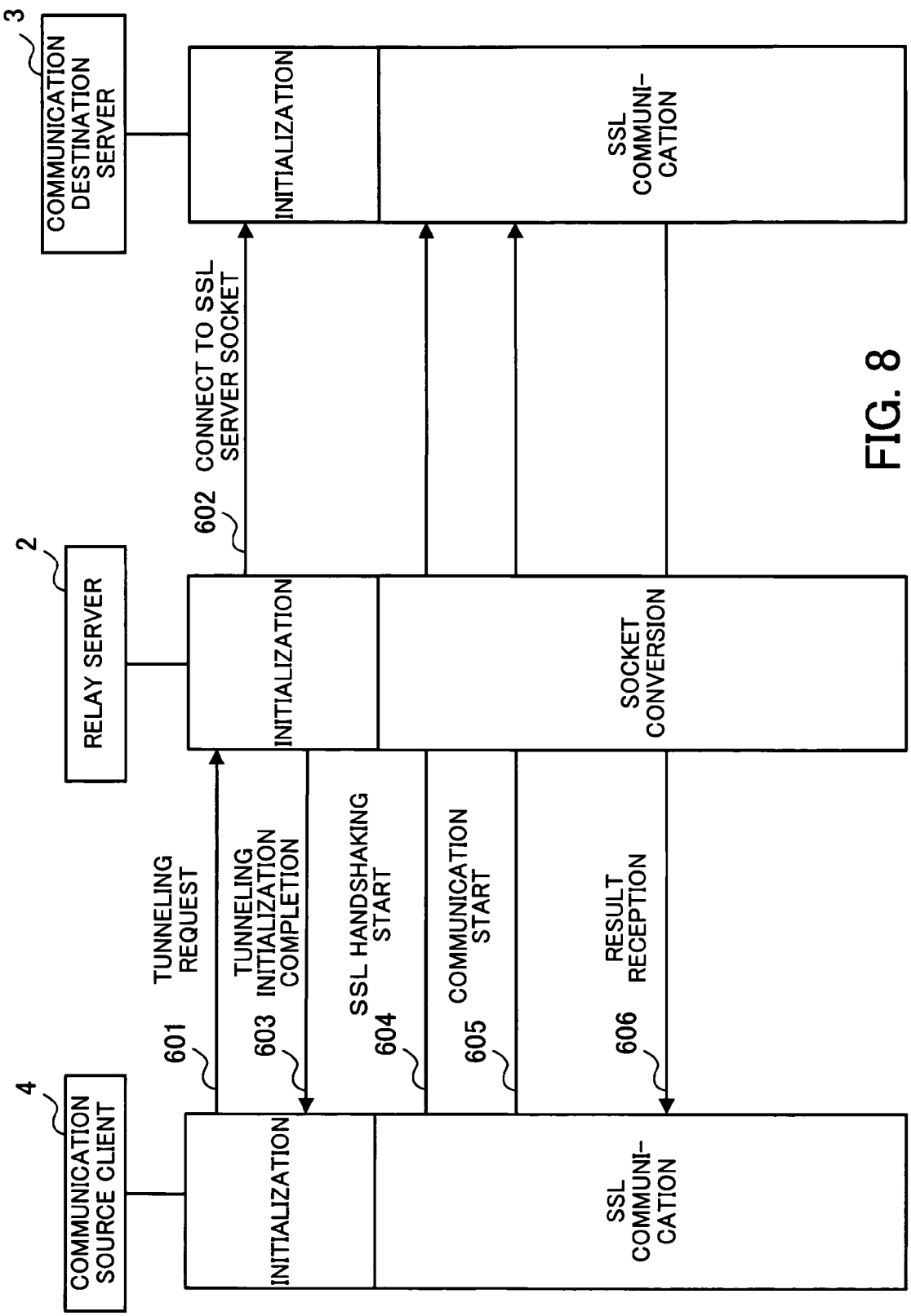
FIG. 8 is a view showing an SSL communication procedure according to the embodiment.

First, a procedure for SSL communication will be described. FIG. 8 is a view showing the procedure for SSL communication according to this embodiment.

First, to perform SSL communication, a tunneling initialization process is performed to establish connections between the communication source client 4, the relay server 2, and the communication destination server 3, and after the tunneling initialization process is completed, the SSL communication procedure is started.

The tunneling initialization procedure is started when the communication source client 4 sends the relay server 2 a tunneling request 601 requesting SSL tunneling communication with the communication destination server 3. The relay server 2 secures the connection with the communication source client 4 and makes a connection request 602 to an SSL server socket of the communication destination server 3 to establish the connection with the communication destination server 3. After the connection with the communication destination server 3 is established, the relay server 2 sends a tunneling initialization completion 603 to the communication source client 4.

With the above procedure, a connection between the communication source client 4 and the relay server 2 and a connection between the relay server 2 and the communication destination server 3 are secured. That is to say, a connection for SSL communication between the communication source client 4 and the communication destination server 3 is established via the relay server 2.

The SSL communication procedure is started when the connection for SSL communication between the communication source client 4 and the communication destination server 3 is established via the relay server 2. When the communication source client 4 sends an SSL handshaking start 604, the communication destination server 3 receives it via the relay server 2, thereby performing handshaking. When the handshaking is completed, the SSL communication is started (605), and its result is retuned (606). During this time, the relay server 2 performs a socket conversion process by changing and sending a packet that the communication source client 4 sent to the socket of the relay server 2, to an SSL server socket of the communication destination server 3, and sending the communication source client 4 a result received from the communication destination server 3. At this time, the relay server 2 just performs the socket conversion process and does not process any data.

With the above procedure, SSL communication can be relayed between a connection source and a connection destination, without touching the contents of the communication.

Figure 9:
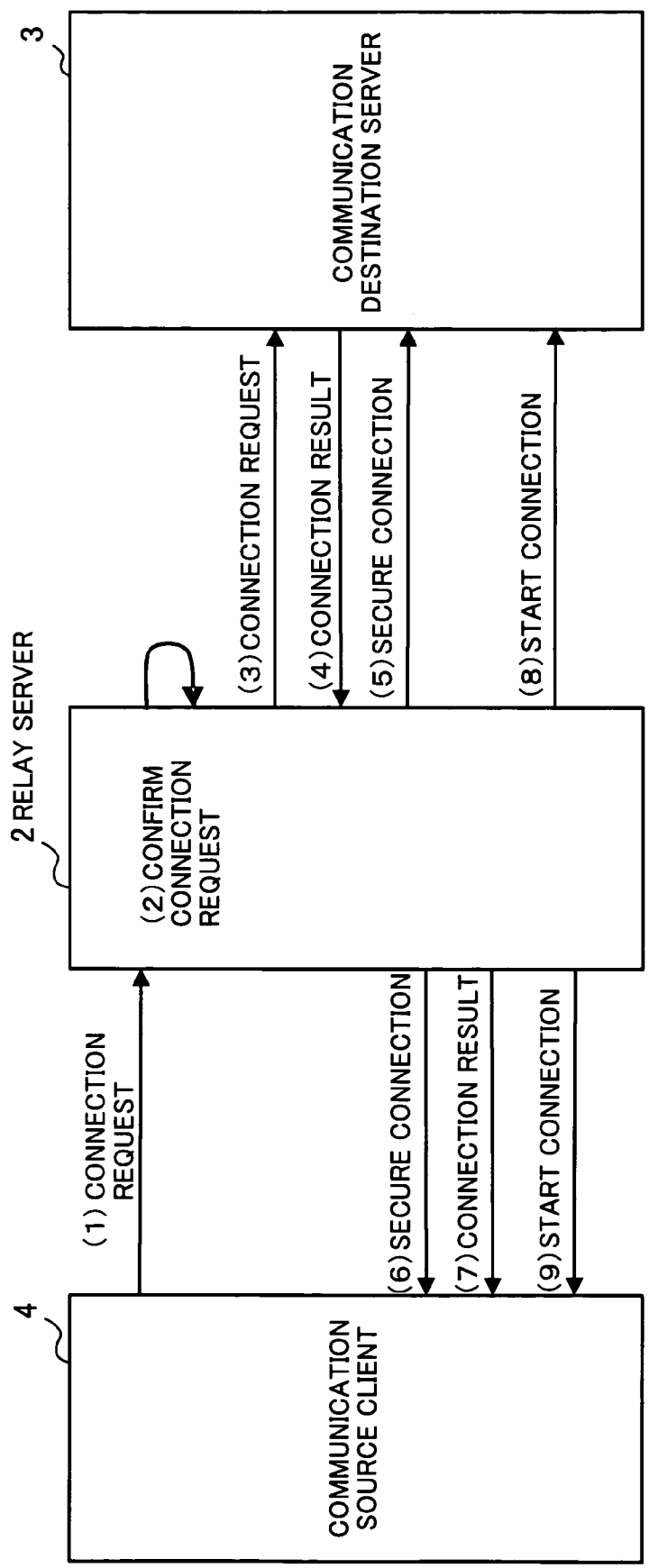
FIG. 9 is a view showing a flow of SSL tunneling communication according to the embodiment.

Now, the SSL tunneling initialization process will be described in detail. FIG. 9 is a view showing a flow of SSL tunneling communication according to this embodiment.

In SSL communication, the communication contents are encrypted by a connection source or a connection destination, and therefore it is very difficult for the relay server to analyze the communication contents. However, to start the SSL communication, a letter string "CONNECT" is written on the first row of an HTTP header as a connection request. Therefore, it is determined whether SSL communication is going to start, based on whether the letter string "CONNECT" exists.

(1) A connection request for SSL communication is issued from the communication source client 4 via the relay server 2. The first row of the HTTP header includes "CONNECT" indicating a request of connection.

(2) The relay server 2 receives the connection request and confirms the contents of the connection request.

(3) The relay server 2 determines the SSL tunneling communication if "CONNECT" is detected, and starts the SSL tunneling process. At this time, the relay server 2 has the connection request from the communication source client 4 that is a connection source, and therefore issues the connection request to the SSL server socket of the communication destination server 3.

(4) The communication destination server 3 returns a connection result.

(5) The relay server 2 secures the connection to perform the tunneling communication.

(6) The relay server 2 establishes a connection with the communication source client 4 according to the connection request (1) from the communication source client 4, and keeps the connection state to perform the tunneling communication.

(7) Since the relay server 2 has received the connection result (4) from the communication destination server 3, it notifies the communication source client 4, which is a connection source, that the connection request has been passed, in place of the communication destination server 3 that is a connection destination.

(8) With the above procedure, the connection between the relay server 2 and the communication destination server 3 is established for the SSL communication, and then the SSL communication process is started.

(9) With the above procedure, the connection between the relay server 2 and the communication source server 4 is established for the SSL communication, and then the SSL communication process is started.

After that, the relay server 2 returns the result of the connection destination (communication destination server 3) to the connection already established with the connection source (communication source client 4), and gives the result of the connection source (communication source client 4) to the connection with the connection destination (communication destination server 3).

Figure 10:
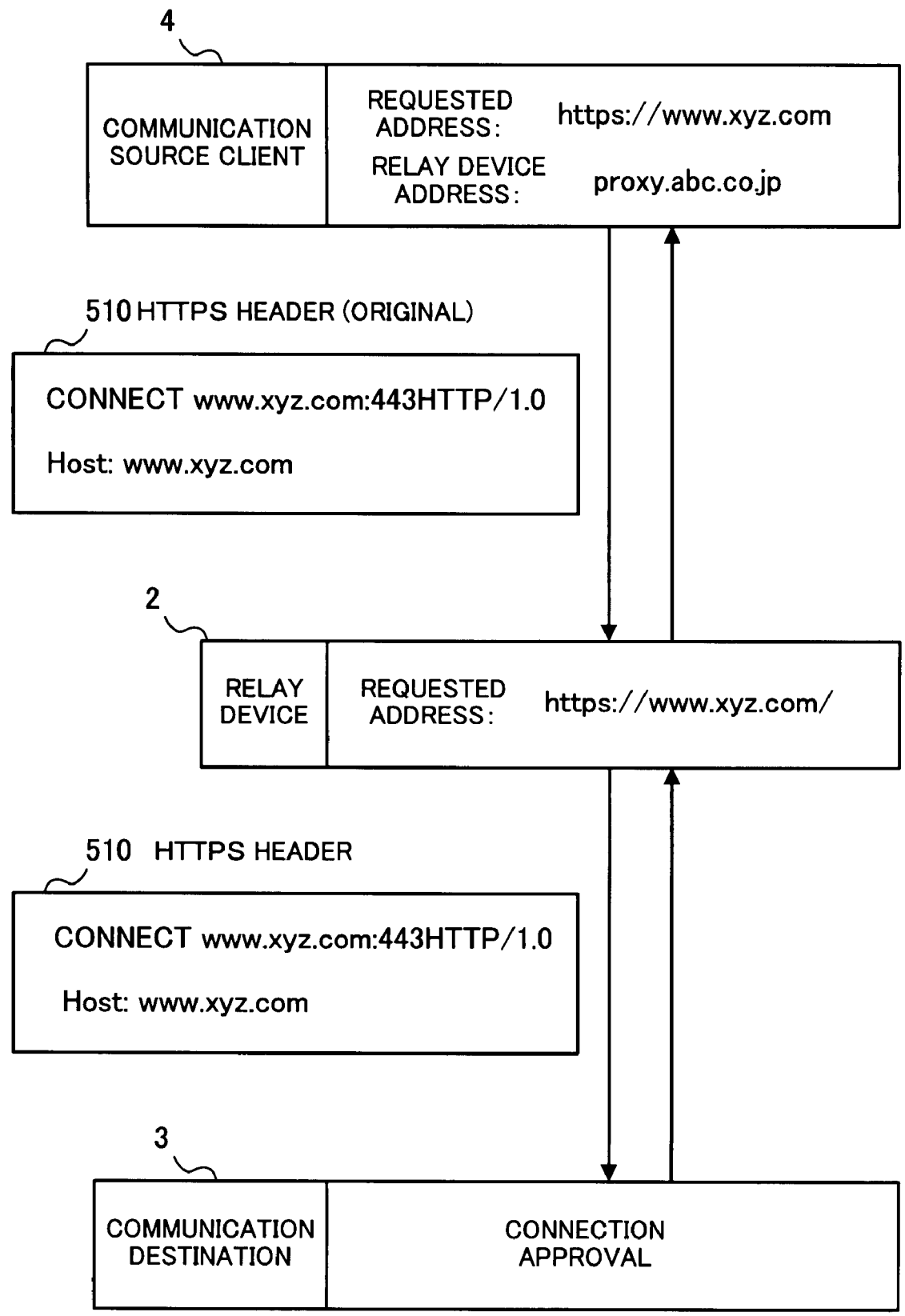
FIG. 10 is a view showing an example of the SSL tunneling communication according to the embodiment.

The above procedure will be specifically described now. FIG. 10 is a view showing an example of SSL tunneling communication according to this embodiment.

The communication source client 4 creates an original HTTPS header 510 by setting the communication destination server 3 as a requested address and the relay server 2 as a relay device address, and sends this with its destination set to the relay server 2. Hereinafter, an HTTP header created with the SSL communication protocol is referred to as an HTTPS header. The HTTPS header 510 is encrypted excepting the first one row. Since the relay server 2 cannot decode the HTTPS header, the relay server 2 does not perform header conversion. Therefore, the original HTTPS header 510 is received by the relay server 2.

The relay server 2 decodes the first one row of the HTTPS header 510, determines SSL communication, and obtains a connection request destination hyperlink "http://www.xyz-.com" (www.xyz.com). The received HTTPS header 510 is sent as it is with the requested address set to the communication destination server 3 (www.xyz.com) obtained from the HTTPS header 510.

In addition, a connection approval from the communication destination server 3 is sent to the communication source client 4 via the relay server 2. At this time, the relay server 2 transfers the approval with only its destination set to the communication source client, without changing its contents.

As described above, the relay server 2 transfers a packet received from the communication source client 4 or the communication destination server 3 to a transfer destination, without changing the contents other than the connection of a transfer destination. Therefore, other than the connection of the transfer destination, the contents of encrypted communication are not changed. In this way, with the SSL tunneling function, SSL communication can be relayed with a high security level, thus making it possible to minimize the number of ports to be set to be allowed in a firewall.

By the way, data communication includes communication that starts in response to a connection request from a communication source client and communication that starts in response to an event occurring at a server side. Hereinafter, the communication that starts in response to an event occurring at the server side is taken as an event notification. Conventionally, when an event notification is made through a firewall, a port for the event notification should be set in the firewall. However, in this embodiment of the invention, the event notification can be made by using an aggregation port that is used for data communication from a communication source client.

Now, an event notification using an aggregation port will be described.

Figure 11:
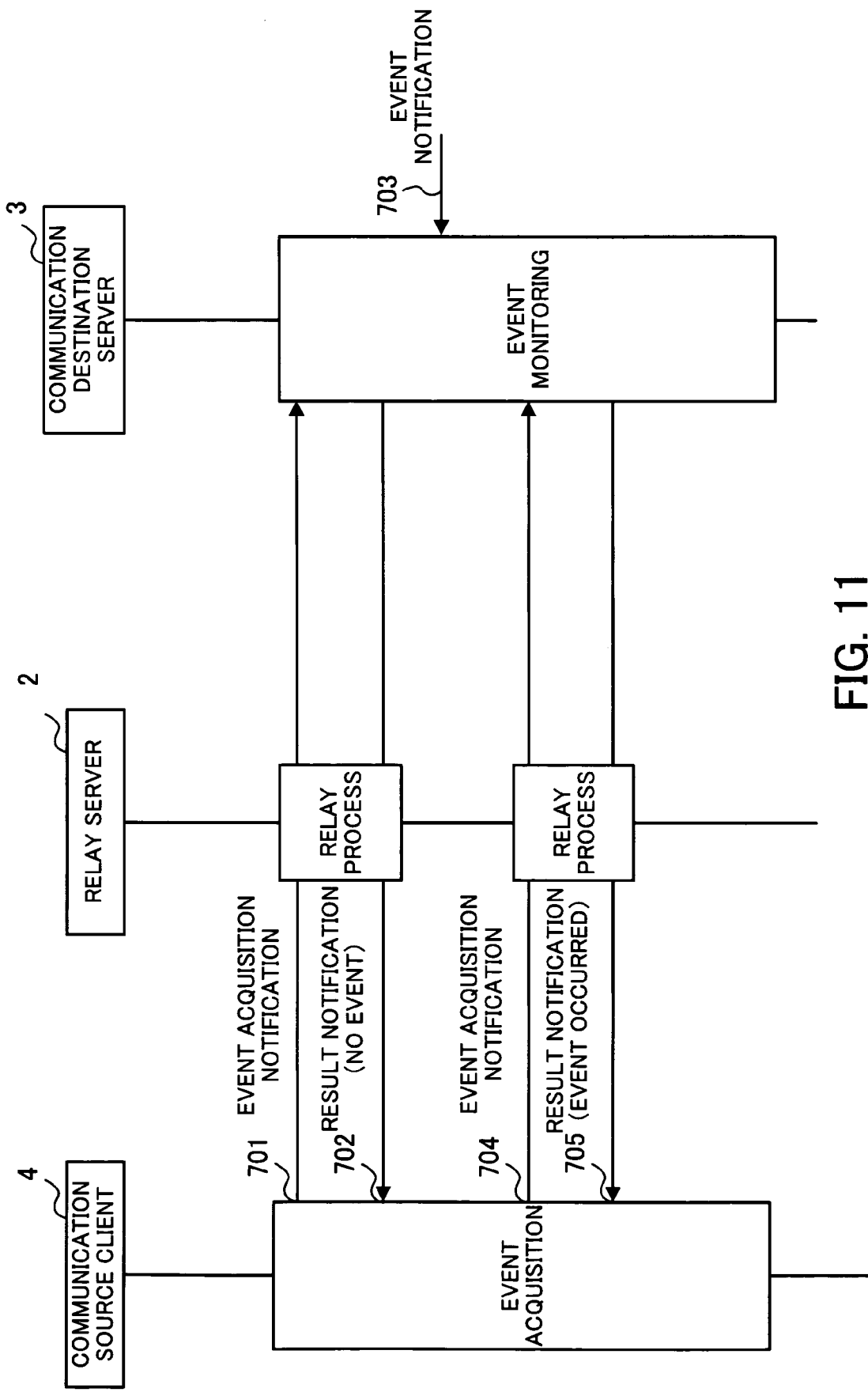
FIG. 11 is a view showing an event notification procedure according to the embodiment.
Figure 12:
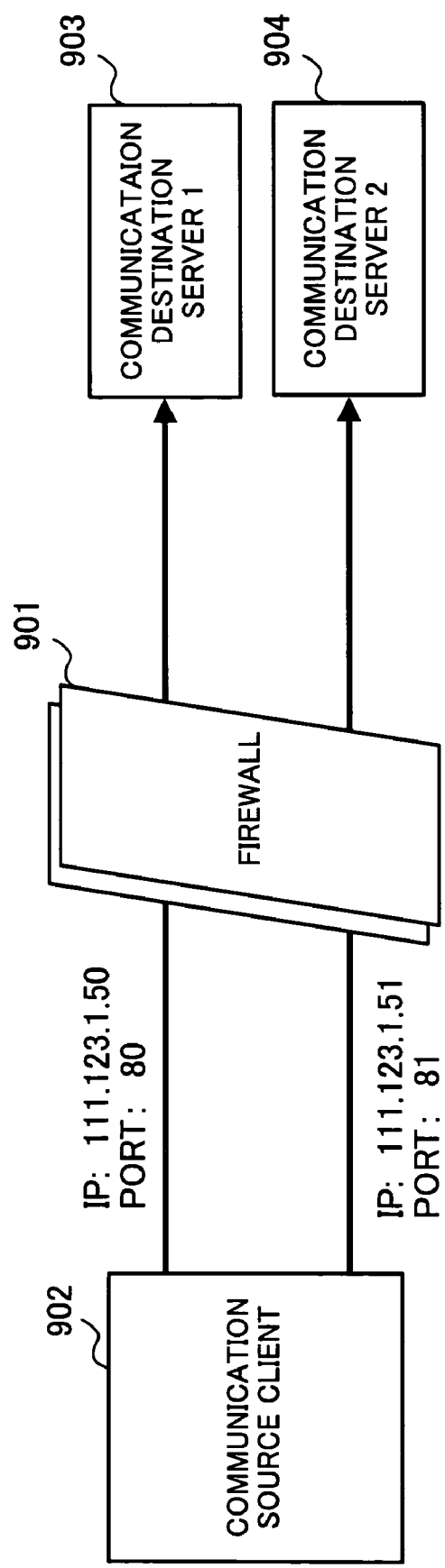
FIG. 12 is a view showing an example of a communication control function using a firewall.

FIG. 11 is a view showing an event notification procedure according to this embodiment.

The communication destination server 3 starts an event monitoring function to monitor occurrence of events. When the communication destination server 3 receives an event notification 703, it temporarily stores its contents therein.

The communication source client 4 that is to receive the event notification starts an event acquisition process, and issues an event acquisition notification 701 to the communication destination server 3 via the relay server 2. The relay server 2 performs a relay process to transfer the event acquisition notification 701 to the communication destination server 3. In the example of this figure, at the time when the event acquisition notification 701 is issued, the communication destination server 3 has not received an event notification. Therefore, a result notification 702 indicating "no event" is issued as a response to the event acquisition notification 701. The result notification 702 indicating "no event" is relayed by the relay server 2 and is received by the communication source client 4.

Since the communication source client 4 cannot obtain an event result, it performs polling at certain timing to issue an event acquisition notification 704 again. The relay server 2 performs the relay process to transfer the event acquisition notification 704 to the communication destination server 3. In the example of this figure, by the time when the event acquisition notification 704 is issued, the communication destination server 3 has obtained the event notification 703 and temporarily stores the information. Therefore, a result notification 705 indicating "event occurred" is issued as a response to the event acquisition notification 704. The result notification 705 indicating "event occurred" is relayed by the relay server 2 and is received by the communication source client 4. In this way, the communication source client 4 acquires the event notification.

As described above, by obtaining an event notification with the polling process by the communication source client side, the event notification is made via the aggregation port.

As the number of ports to be set to be allowed in a firewall is fewer, security can be secured. By making an event acquisition request from the communication source client 4 at prescribed timing, the event notification can be performed via an aggregation port. As a result, ports to be set to be allowed in the firewall can be aggregated, thus making is possible to avoid creation of security holes in a firewall.

The processing functions described above can be realized by a server computer and a client computer. In this case, a server program is prepared, which describes processes for the functions to be performed by the relay server, and also a client program is prepared, which describes processes for the functions to be performed by a communication source client. The server program is executed by the server computer, whereupon the processing functions of the relay server are accomplished by the server computer. In addition, the communication processing program is executed by the client computer, whereupon the processing functions of the communication source client are accomplished by the client computer.

The server program and the client program, which describes the required processes, may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include DVDs (Digital Versatile Disc), DVD-RAM (Random Access Memory), CD-ROM (Compact Disc Read Only Memory), CD-R (Recordable)/RW (ReWritable), etc. The magneto-optical recording media include MOs (Magneto-Optical disks) etc.

To distribute the server program and the client program, portable recording media, such as DVDs and CD-ROMs, on which the program is recorded may be put on sale. Alternatively, the client program may be stored in the storage device of the server computer and may be transferred from the server computer to the client computer through a network.

The server computer which is to execute the server program stores in its storage device the server program recorded on a portable recording medium. The server computer reads the server program from the storage device and executes a process according to the server program. Alternatively, the server computer may run the server program directly from the portable recording medium to execute the process according to the server program.

The client computer which is to execute the client program stores in its storage device the client program recorded on a portable recording medium or transferred from the server computer, for example. Then, the client computer reads the client program from the storage device and executes the process according to the client program. The client computer may run the client program directly from the portable recording medium. Also, while receiving the client program being transferred from the server computer, the client computer may sequentially run this program.

According to the present invention, a relay server collects requests received from a communication source client connected to an external network, and distributes the requests to communication destination servers connected to an internal network. Therefore, ports to be set in a firewall can be aggregated into one port at minimum. This realizes simplifying management of ports to be set in the firewall. As a result, creation of security holes due to man-caused errors including errors in setting and missing of version upgrading can be prevented and the security level can be maintained.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

The invention claimed is:

1. A computer-readable recording medium containing a relay program for relaying data communication through a firewall installed at a connection point between an external network and an internal network to manage communication, the relay program causing a computer to perform as:

connection request information acquisition means for receiving connection request information including a target connection request destination which was issued by a communication source client with a destination set to an aggregation port to make a connection request with the target connection request destination and is to be input via the aggregation port when the firewall allows the connection request information to pass through, the aggregation port being an aggregation of one or a plurality of ports to be allowed to be accessed and being set to be allowed in the firewall, the communication source client connected to the external network, the target connection request destination being in the internal network; and relay means for extracting the target connection request destination from the connection request information and sending the connection request information with the destination set to the target connection request destination to make the connection request, and also receiving connection result information from the target connection request destination and sending the connection result information to the communication source client;

wherein the relay means updates contents of the connection request information by adding information necessary for the target connection request destination which is the destination when the connection request information is sent to the target connection request destination or by deleting information unnecessary for the communication source client which is the destination when the connection result information is sent to the communication source client, and sends the connection request information.

2. The computer-readable recording medium according to claim 1, further causing the computer to perform as tunneling means for securing a connection with the communication source client based on the connection request information received from the communication source client, then establishing a connection with the target connection request destination by sending the connection request information received from the communication source client to the target connection request destination, and then while keeping the secured connection with the communication source client and the established connection with the target connection request destination, sending with the relay means a packet received from the communication source client to the target connection request destination and sending a response packet received from the target connection request destination to the communication source client.

3. The computer-readable recording medium according to claim 2, wherein the tunneling means changes only a destination of transfer of the packet to be relayed and does not change contents of the packet in communication to be performed after the connection with the communication source client and the connection with the target connection request destination are secured.

4. The computer-readable recording medium according to claim 2, wherein the connection request information acquisition means analyzes the connection request information received from the communication source client, and starts the tunneling means when the connection request information requests SSL (Secure Sockets Layer) communication.

5. The computer-readable recording medium according to claim 1, wherein, when the connection request information received by the connection request information acquisition means includes route information on a relay device having the aggregation port according to HTTP (Hypertext Transfer Protocol), the relay means deletes the route information from the connection request information and sends the connection request information to the target connection request destination, and also adds the route information to the connection result information received from the target connection request destination and then sends the connection result information to the communication source client.

6. A computer-readable recording medium containing a communication processing program for performing a communication process with a server connected to an internal network through a firewall installed at a connection point between an external network and the internal network to manage communication, the communication processing program causing a computer to perform as:

communication processing means for creating connection request information including a target connection request destination and issuing the connection request information with a destination set to an aggregation port of a relay server to make a connection request when accessing the target connection request destination connected to the internal network through the firewall, and also receiving via the relay server connection result information created by the target connection request destination in response to the connection request information relayed by the relay server having the aggregation port to the target connection request destination, the aggregation port being an aggregation of one or a plurality of ports to be allowed to be accessed and being set to be allowed in the firewall;

wherein, when information on the target connection request destination and the connection request information including an acquisition request of information on an prescribed event occurring at the target connection request destination is received from a prescribed application, the communication processing means repeats a process of setting the target connection request destination in the connection request information including the acquisition request of the information on the prescribed event, sending the connection request information with the destination set to the aggregation port, and receiving a response, at prescribed timing until acquiring the information on the prescribed event.

7. The computer-readable recording medium according to claim 6, wherein, when the information on the target connection request destination and the connection request information to the target connection request destination are received from a prescribed application, the communication processing means changes the connection request information by adding route information on the relay server to the connection request information and then sends the changed connection request information with the destination set to the aggregation port.

8. A firewall system having a firewall that is installed at a connection point between an external network and an internal network and allows only packets of a port previously set to be allowed, comprising:
the firewall where an aggregation port that is an aggregation of one or a plurality of ports to be allowed to be accessed is set to be allowed and which acquires an access from a communication source client connected to the external network and allows only an access specifying the aggregation port as a destination to pass through;
a communication source client that creates connection request information including a target connection request destination and issues the connection request information with a destination set to the aggregation port when accessing the target connection request destination connected to the internal network through the firewall, and also receives connection result information created by the target connection request destination in response to the connection request information; and
a relay server that is provided with the aggregation port and includes connection request information acquisition means for receiving the connection request information that was issued by the communication source client and was allowed by the firewall to pass through, and relay means for sending the connection request information with the destination changed to the target connection request destination based on the received connection request information, and also receiving the connection result information from the target connection request destination and sending the connection result information to the communication source client, wherein the connection request information issued by the communication source client is collectively received by the relay server to be distributed to the target connection request destination, and the connection result information created by the target connection request destination is relayed by the relay server to the communication source client making a connection request;
wherein the relay server updates contents of the connection request information by adding information necessary for the target connection request destination which is the destination when the connection request information is sent to the target connection request destination or by deleting information unnecessary for the communication source client which is the destination when the connection result information is sent to the communication source client, and sends the connection request information.

9. A relay method for relaying data communication through a firewall installed at a connection point between an external network and an internal network to manage communication, the relay method comprising:
a connection request information acquisition step of receiving connection request information including a target connection request destination which was issued by a communication source client with a destination set to an aggregation port to make a connection request with the target connection request destination and is to be input via the aggregation port when the firewall allows the connection request information to pass through, the aggregation port being an aggregation of one or a plurality of ports to be allowed to be accessed and being set to be allowed in the firewall, the communication source client connected to the external network, the target connection request destination being in the internal network; and
a relay step of extracting the target connection request destination from the connection request information and sending the connection request information with the destination set to the target connection request destination to make the connection request, and also receiving connection result information from the target connection request destination and sending the connection result information to the communication source client;
wherein at the relay step, contents of the connection request information are undated by adding information necessary for the target connection request destination which is the destination when the connection request information is sent to the target connection request destination or by deleting information unnecessary for the communication source client which is the destination when the connection result information is sent to the communication source client, and the connection request information is sent.

10. The relay method according to claim 9, further comprising a tunneling step of securing a connection with the communication source client based on the connection request information received from the communication source client, then establishing a connection with the target connection request destination by sending the connection request information received from the communication source client to the target connection request destination, and then while keeping the secured connection with the communication source client and the established connection with the target connection request destination, sending at the relay step a packet received from the communication source client to the target connection request destination and sending a response packet received from the target connection request destination to the communication source client.

11. A communication processing method for performing a communication process with a server connected to an internal network through a firewall installed at a connection point between an external network and the internal network to manage communication, the communication processing method comprising the step of:
creating connection request information including a target connection request destination and issuing the connection request information with a destination set to an aggregation port of a relay server to make a connection request when accessing the target connection request destination connected to the internal network through the firewall, and also receiving via the relay server connection result information created by the target connection request destination in response to the connection request information relayed by the relay server having the aggregation port to the target connection request destination, the aggregation port being an aggregation of one or a plurality of ports to be allowed to be accessed and being set to be allowed in the firewall;

wherein, when information on the target connection request destination and the connection request information including an acquisition request of information on an prescribed event occurring at the target connection request destination is received from a prescribed application, a process of setting the target connection request destination in the connection request information including the acquisition request of the information on the prescribed event, sending the connection request information with the destination set to the aggregation port, and receiving a response, is repeated at prescribed timing until acquiring the information on the prescribed event.

12. The communication processing method according to claim 11, wherein, when the information on the target connection request destination and the connection request information to the target connection request destination are received from a prescribed application, the connection request information is changed by adding route information on the relay server to the connection request information and then the changed connection request information is sent with the destination set to the aggregation port.

* * * * *